US011099027B2

(12) United States Patent
Nagata

(10) Patent No.: US 11,099,027 B2
(45) Date of Patent: Aug. 24, 2021

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventor: Yu Nagata, Yashio (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 271 days.

(21) Appl. No.: 16/294,430

(22) Filed: Mar. 6, 2019

(65) Prior Publication Data

US 2019/0310101 A1 Oct. 10, 2019

(30) Foreign Application Priority Data

Apr. 5, 2018 (JP) .............................. JP2018-073419

(51) Int. Cl.
*G08G 1/00* (2006.01)
*G01C 21/36* (2006.01)
*G08G 1/0968* (2006.01)

(52) U.S. Cl.
CPC ..... *G01C 21/3691* (2013.01); *G01C 21/3617* (2013.01); *G08G 1/096833* (2013.01)

(58) Field of Classification Search
CPC ............ G01C 21/3691; G01C 21/3617; G08G 1/096833

USPC ......... 701/117, 118, 439; 340/995.1, 995.13, 340/995.24

See application file for complete search history.

(56) References Cited

U.S. PATENT DOCUMENTS

| | | | |
|---|---|---|---|
| 2005/0090974 A1* | 4/2005 | Hirose ................. | G08G 1/0969 701/532 |
| 2007/0143011 A1* | 6/2007 | Sato .................... | G01C 21/3461 701/417 |
| 2017/0262790 A1* | 9/2017 | Khasis ................. | G08G 1/012 |
| 2017/0337810 A1* | 11/2017 | Abe .................... | G01C 21/3492 |

FOREIGN PATENT DOCUMENTS

JP 2003-121182 A 4/2003

* cited by examiner

*Primary Examiner* — Dalena Tran
(74) *Attorney, Agent, or Firm* — Oliff PLC

(57) ABSTRACT

In an information processing device, an acquirer acquires an estimated congestion degree at each time at a destination based on route search result data. A route search unit searches for a route from a departure point to the destination such that a user arrives at the destination out of a time period during which an estimated congestion degree at the destination acquired at the acquirer is a predetermined value or greater.

8 Claims, 3 Drawing Sheets

INFORMATION PROCESSING DEVICE AND INFORMATION PROCESSING METHOD

The disclosure of Japanese Patent Application No. 2018-073419 filed on Apr. 5, 2018 including the specification, drawings and abstract is incorporated herein by reference in its entirety.

BACKGROUND

1. Technical Field

The present disclosure relates to an information processing device and an information processing method for searching for a route from a departure point to a destination.

2. Description of Related Art

A known technology relates to a navigation device for conveying a route from the current position to a destination and provides, as a detour route candidate to be conveyed, a detour route such that a calculated expected arrival time at the destination is earlier than a desired arrival time at the destination (see JP-A-2003-121182, for example).

The technology described in JP-A-2003-121182 merely provides a detour route such that the user can arrive by a predetermined time, and the place may be crowded when the user arrives at the destination.

SUMMARY

The present disclosure addresses the above-described issue, and a general purpose thereof is to provide an information processing device and an information processing method for providing route information with which congestion at the destination can be avoided.

In response to the above issue, an information processing device of one aspect of the present embodiment includes: an acquirer configured to acquire an estimated congestion degree at each time at a destination on the basis of route search result data; and a route search unit configured to search for a route from a departure point to the destination such that a user arrives at the destination out of a time period during which an estimated congestion degree at the destination acquired at the acquirer is a predetermined value or greater.

According to this aspect, since the estimated congestion degree at each time at a destination based on the route search result data is acquired, and since a route is searched for such that the user arrives at the destination out of a time period during which the estimated congestion degree is a predetermined value or greater, route information with which congestion at the destination can be avoided may be provided.

The route search unit may search for a route from the departure point to the destination via a stopover such that a user arrives at the destination later than a time period during which an estimated congestion degree at the destination is a predetermined value or greater.

The information processing device may further include an output unit configured to output a route searched for and information regarding the stopover.

The route search unit may search for a route such that a user arrives at the destination earlier than a time period during which an estimated congestion degree at the destination is a predetermined value or greater.

Another aspect of the present embodiment relates to an information processing method. The information processing method includes: acquiring an estimated congestion degree at each time at a destination on the basis of route search result data; and searching for a route from a departure point to the destination such that a user arrives at the destination out of a time period during which an estimated congestion degree at the destination acquired is a predetermined value or greater.

According to this aspect, since the estimated congestion degree at each time at a destination based on the route search result data is acquired, and since a route is searched for such that the user arrives at the destination out of a time period during which the estimated congestion degree is a predetermined value or greater, route information with which congestion at the destination can be avoided may be provided.

In the searching, a route from the departure point to the destination via a stopover may be searched for such that a user arrives at the destination later than a time period during which an estimated congestion degree at the destination is a predetermined value or greater.

The information processing method may further include outputting a route searched for and information regarding the stopover.

In the searching, a route may be searched for such that a user arrives at the destination earlier than a time period during which an estimated congestion degree at the destination is a predetermined value or greater.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

Various embodiments now will be described. The embodiments are illustrative and are not intended to be limiting.

Figure 1:
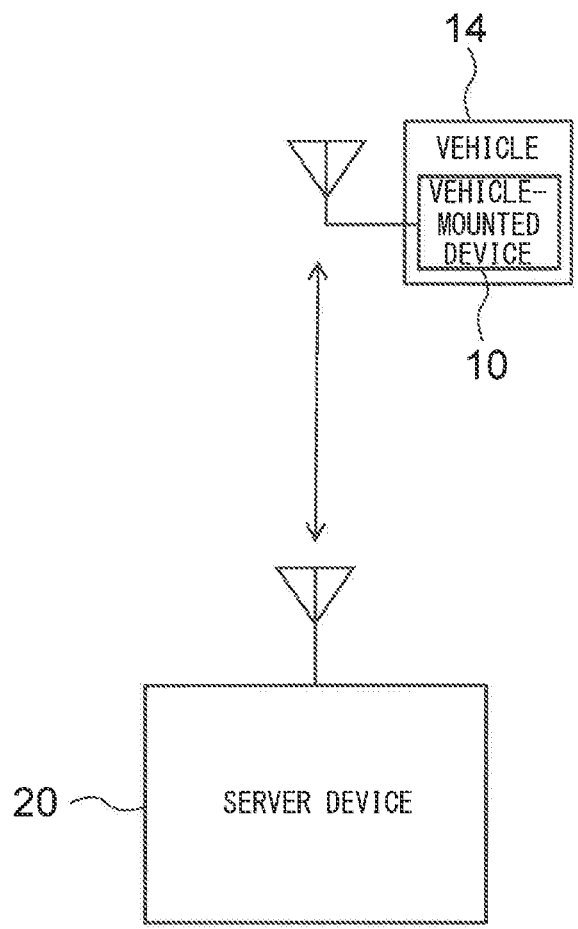
FIG. 1 is a block diagram that shows a configuration of an information processing system according to an embodiment.

FIG. 1 is a block diagram that shows a configuration of an information processing system 1 according to an embodiment. The information processing system 1 includes a vehicle-mounted device 10 and a server device 20. Although the embodiment describes an example in which one vehicle-mounted device 10 is provided in the interest of clarity, the information processing system 1 may include multiple vehicle-mounted devices 10.

The vehicle-mounted device 10 may be a car navigation device or the like mounted on a vehicle 14, which is an automobile. The vehicle-mounted device 10 performs wireless communication with the server device 20. The wireless communication standard is not particularly limited, and may be 3G (third-generation mobile communication system), 4G (fourth-generation mobile communication system), or 5G (fifth-generation mobile communication system), for example. The vehicle-mounted device 10 may perform wireless communication with the server device 20 via a base station, which is not illustrated.

The vehicle-mounted device 10 can accept, from a user, an entry of route search information used for a route search. The route search information may include a departure point, a destination, date and time of arrival at the destination, and whether or not toll roads are preferentially used, for example. The current position may be designated as the departure point. When the date and time of arrival at the destination is not entered, the departure time is set to the current time. When toll roads are not preferentially used, ordinary roads are preferentially used. The route search information may also include a stopover via which the user moves to a destination, and sojourn time at the stopover. The vehicle-mounted device 10 transmits the route search information thus entered to the server device 20. To the route search information, information for identifying the vehicle 14 as the transmission source is attached.

The server device 20 may be installed in a data center, for example, and functions as an information processing device for processing information transmitted from the vehicle-mounted device 10 to perform a route search.

Figure 2:
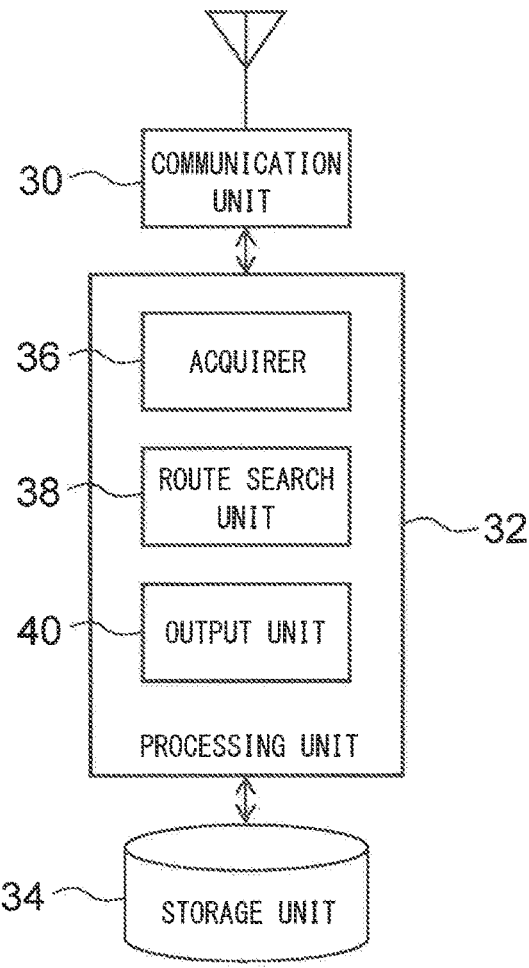
FIG. 2 is a block diagram that shows a configuration of a server device shown in FIG. 1.

FIG. 2 is a block diagram that shows a configuration of the server device 20 shown in FIG. 1. The server device 20 includes a communication unit 30, a processing unit 32, and a storage unit 34. The processing unit 32 includes an acquirer 36, a route search unit 38, and an output unit 40.

The communication unit 30 performs wireless communication with the vehicle-mounted device 10. The communication unit 30 receives route search information from the vehicle-mounted device 10. Based on the route search information received at the communication unit 30, the processing unit 32 performs a route search.

The storage unit 34 stores map data in advance. The map data includes information regarding various facilities that could be stopovers, such as roadside stations and commercial facilities. The map data also includes information regarding public transportation, such as trains and buses. The information regarding public transportation includes information regarding timetables of public transportation.

In the following, the configuration of the processing unit 32 will be described in the order of (1) Case where the user departs at the current time, and (2) Case where the date and time of arrival at the destination is specified.

(1) Case where the User Departs at the Current Time

The acquirer 36 acquires route search information received at the communication unit 30. The acquirer 36 then outputs the route search information to the route search unit 38.

When the route search information thus output from the acquirer 36 does not include date and time of arrival at the destination, the route search unit 38 searches for a route from the departure point to the destination for the case where the user departs at the current time and travels by car, based on the route search information and the map data stored in the storage unit 34, and the route search unit 38 then derives an arrival time at the destination when the route thus searched for is used.

When the route search information includes information indicating no preference for toll roads, the route search unit 38 searches for a route that does not include a toll road. When the route search information includes a stopover, the route search unit 38 searches for a route that passes through the stopover. In this case, the route search unit 38 derives the arrival time by adding the sojourn time at the stopover included in the route search information to the traveling time through the route. Since a publicly-known technology may be used for the route search, a further description therefor is omitted.

The acquirer 36 may acquire traffic information from another server device, which is not illustrated, using wireless or wired communication via the communication unit 30. The traffic information includes traffic congestion information, road regulation information, and suspension information and delay information regarding public transportation, for example. The route search unit 38 may derive the arrival time at the destination also using such traffic information. The suspension information and the delay information may be used to search for a route in which public transportation is used, which will be described later.

Based on the destination included in the acquired route search information, the acquirer 36 acquires an estimated congestion degree at each time at the destination based on route search result data, from another server device, not illustrated, using wireless or wired communication via the communication unit 30. The acquirer 36 acquires the estimated congestion degree at each time at the destination for the day on which the route search is conducted.

The route search result data is result data of route searches with a given point set as the destination conducted by multiple users, using a route search application on another server device, for example. In the route searches, public transportation, including trains, buses, airplanes, and ships, and private vehicles are used as transportation. The route search result data, accumulated each time a user conducts a route search, includes the destination and the date and time of arrival at the destination of each route search. Based on the route search result data, the number of visitors to a destination on given date and time in the future can be estimated. On the day when there is an event at the destination or when free admission to the facilities at the destination is offered, it is predicted that the number of searches for routes to the destination will be increased compared to other days, and the number of visitors will also be increased.

Based on the route search result data, the another server device derives the estimated congestion degree at each time for each of multiple destinations. The estimated congestion degree may be expressed as the number of searches, for example. The acquirer 36 may acquire the route search result data from the another server device and derive the estimated congestion degree at each time at a destination based on the route search result data. This corresponds to acquiring, by the acquirer 36, the estimated congestion degree at each time at a destination based on the route search result data.

Figure 3:
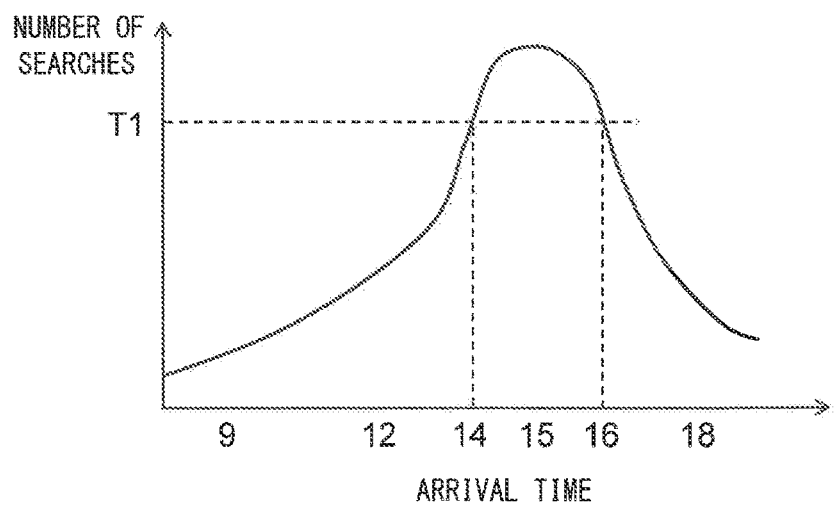
FIG. 3 is a diagram that shows an example of an estimated congestion degree at each time for a destination entered into a vehicle-mounted device shown in FIG. 1.

FIG. 3 is a diagram that shows an example of the estimated congestion degree at each time for a destination entered into the vehicle-mounted device 10 shown in FIG. 1. In the example shown in FIG. 3, the number of searches, i.e., the estimated congestion degree, increases as the arrival time gets closer to around 15 o'clock, and the number of searches decreases as the arrival time becomes later than around 15 o'clock. During the time period from 14 o'clock to 16 o'clock, the estimated congestion degree is a predetermined value T1 or greater. The predetermined value T1 is preset for each destination and stored in the storage unit 34. The predetermined value T1 is set based on the scale of the destination. For a destination that can accommodate a large number of visitors, the predetermined value T1 is set higher than for a destination that can accommodate a small number of visitors. The predetermined value T1 may be appropriately set based on the relationship between the estimated congestion degree at a destination on a given day and the actual number of visitors to the destination on the day, for example. A time period during which the estimated congestion degree at a destination acquired at the acquirer 36 is the predetermined value T1 or greater will be referred to as a congestion time period.

The description will now return to FIG. 2. When the arrival time at a destination on a route searched for is included in the congestion time period, the route search unit 38 searches for at least one new route from the departure point to the destination such that the user can arrive at the destination out of the congestion time period. The route search unit 38 may search for a route in which public transportation is used as the transportation, besides a route in which a vehicle is used as the transportation.

More specifically, the route search unit 38 searches for a route from the departure point through a stopover to the destination such that the user arrives at the destination later than the congestion time period. The route search unit 38 selects, as a stopover, one of multiple facilities included in the map data. To each facility, a predetermined sojourn time is related. The sojourn time may be, for example, an average sojourn time of users of the facility acquired in advance. To each facility, at least one of advertisement for the facility and information regarding coupons that can be used in the facility may also be related. Coupons provide benefit of obtaining discounts at the time of purchase of goods or services at the facility. The route search unit 38 derives the arrival time at the destination by adding the sojourn time related to the facility selected as a stopover to the traveling time through the route.

The route search unit 38 may set the departure time later than the current time and search for a route from the departure point to the destination without any stopover such that the user arrives at the destination later than the congestion time period.

The route search unit 38 also searches for a route from the departure point to the destination such that the user arrives at the destination a predetermined time or more earlier than the congestion time period. The predetermined time is preset for each destination. When the route search information includes a stopover, for example, the route search unit 38 may search for a route from the departure point to the destination without any stopover. When the route search information includes information indicating no preference for toll roads, the route search unit 38 may preferentially search for a route from the departure point to the destination including a toll road. When the traveling time is getting longer because of traffic congestion or road regulations, the route search unit 38 may search for a route from the departure point to the destination in which public transportation is used. Thus, there could be found a route through which the user can arrive at the destination earlier than the congestion time period.

Figure 4:
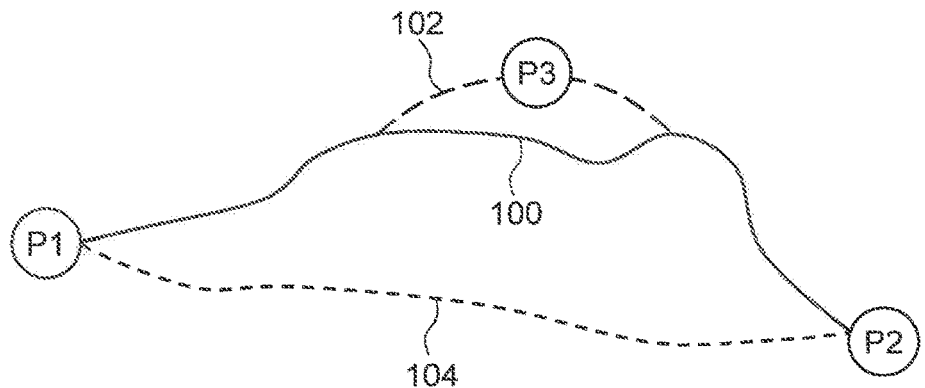
FIG. 4 is a diagram used to describe a route searched for by the server device shown in FIG. 2.

FIG. 4 is a diagram used to describe a route searched for by the server device 20 shown in FIG. 2. A route 100 is a route from a departure point P1 to a destination P2 and only includes ordinary roads. The arrival time at the destination P2 when the route 100 is used is 14:10, which is included in the congestion time period shown in FIG. 3. Accordingly, a route 102 and a route 104 are newly searched for.

The route 102 is a route from the departure point P1 through a stopover P3 to the destination P2 and only includes ordinary roads. The arrival time at the destination P2 when the route 102 is used is 16:30, which means that the user arrives at the destination P2 later than the congestion time period shown in FIG. 3. The route 104 is a route from the departure point P1 to the destination P2 and includes a toll road. The arrival time at the destination P2 when the route 104 is used is 13:30, which means that the user arrives at the destination P2 earlier than the congestion time period shown in FIG. 3.

The description will now return to FIG. 2. When the arrival time at a destination on a route searched for first time is not included in the congestion time period, and when a route through which the user can arrive at a destination out of the congestion time period can be searched for, the route search unit 38 provides, to the output unit 40, congestion time period information and route information of the route searched for. The route information includes at least one route, the transportation used on each route, the departure time for each route, the arrival time at the destination for each route, and information regarding a stopover. The information regarding a stopover includes the name of a facility at the stopover, advertisement for the facility, and information regarding coupons that can be used in the facility. The output unit 40 outputs the congestion time period information and the route information thus provided to the communication unit 30. The communication unit 30 then transmits, to the vehicle-mounted device 10, the congestion time period information and the route information output from the output unit 40. To these pieces of information, information for identifying the vehicle 14 as the transmission destination is attached.

The vehicle-mounted device 10 receives the congestion time period information and the route information transmitted from the communication unit 30 and displays the congestion time period information and the route information thus received on the display. The vehicle-mounted device 10 may create a message based on the congestion time period information and the route information, and may perform at least one of displaying the created message as characters and outputting the created message as sound. The message may be, for example, "The place may be congested from 14 o'clock to 16 o'clock. A route preferentially including toll roads is recommended so that you can arrive before the congestion time period. If you wish to arrive later than the congestion time period, you might like to stop at a roadside station on the way. Coupons are available if you like."

The user can select a desired route from among the displayed routes. According to the selected route, the vehicle-mounted device 10 can perform route guidance. When the user has selected a route in which public transportation is used, the user gets out of the vehicle 14 to travel. In this case, the vehicle-mounted device 10 may transmit the route information regarding the route in which public transportation is used, to a mobile terminal device, such as a smartphone, carried by the user.

(2) Case where the Date and Time of Arrival at the Destination is Specified

Description will be given mainly for the differences from (1). As a situation where the date and time of arrival is specified, the situation where a route search is conducted on the day before the departure day, or the situation where a route search is conducted in advance on the morning of the departure day may be considered, for example. When the route search information output from the acquirer 36 includes date and time of arrival, the route search unit 38 searches for a route for vehicles from the departure point to the destination and derives a departure time such that the user can arrive at the destination on the date and time of arrival.

Based on the destination and the date and time of arrival included in the acquired route search information, the acquirer 36 acquires, from another server device, the estimated congestion degree at each time at the destination on the arrival day based on the route search result data.

Since the number of searches is expected to increase as it gets closer to the arrival day, a predetermined value used to determine the congestion time period based on the estimated congestion degree may be set greater as the time from the current time to the arrival day becomes shorter. The predetermined value based on the time from the current time to the arrival day may be appropriately set based on the relationship between a change over time of the estimated congestion degree at a destination on a given day and the actual number of visitors to the destination on the day, for example.

When the arrival time at a destination included in the route search information is included in the congestion time period, the route search unit 38 searches for at least one of a route that passes through a stopover and a route that does not pass through a stopover such that the user arrives at the destination later than the congestion time period, in the same way as described in the aforementioned processing.

When the arrival time at a destination is included in the congestion time period, the route search unit 38 also searches for a route such that the user arrives at the destination a predetermined time or more earlier than the congestion time period, in the same way as described in the aforementioned processing. In addition, the route search unit 38 sets the departure time earlier and searches for a route such that the user arrives at the destination earlier than the congestion time period. The other processes are the same as described in (1).

The configuration of the processing unit 32 may be implemented by a CPU or memory of any given computer, an LSI, or the like in terms of hardware, and by a memory-loaded program or the like in terms of software. In the present embodiment is shown a functional block configuration realized by cooperation thereof. Therefore, it would be understood by those skilled in the art that these functional blocks may be implemented in a variety of forms by hardware only, software only, or a combination thereof.

Figure 5:
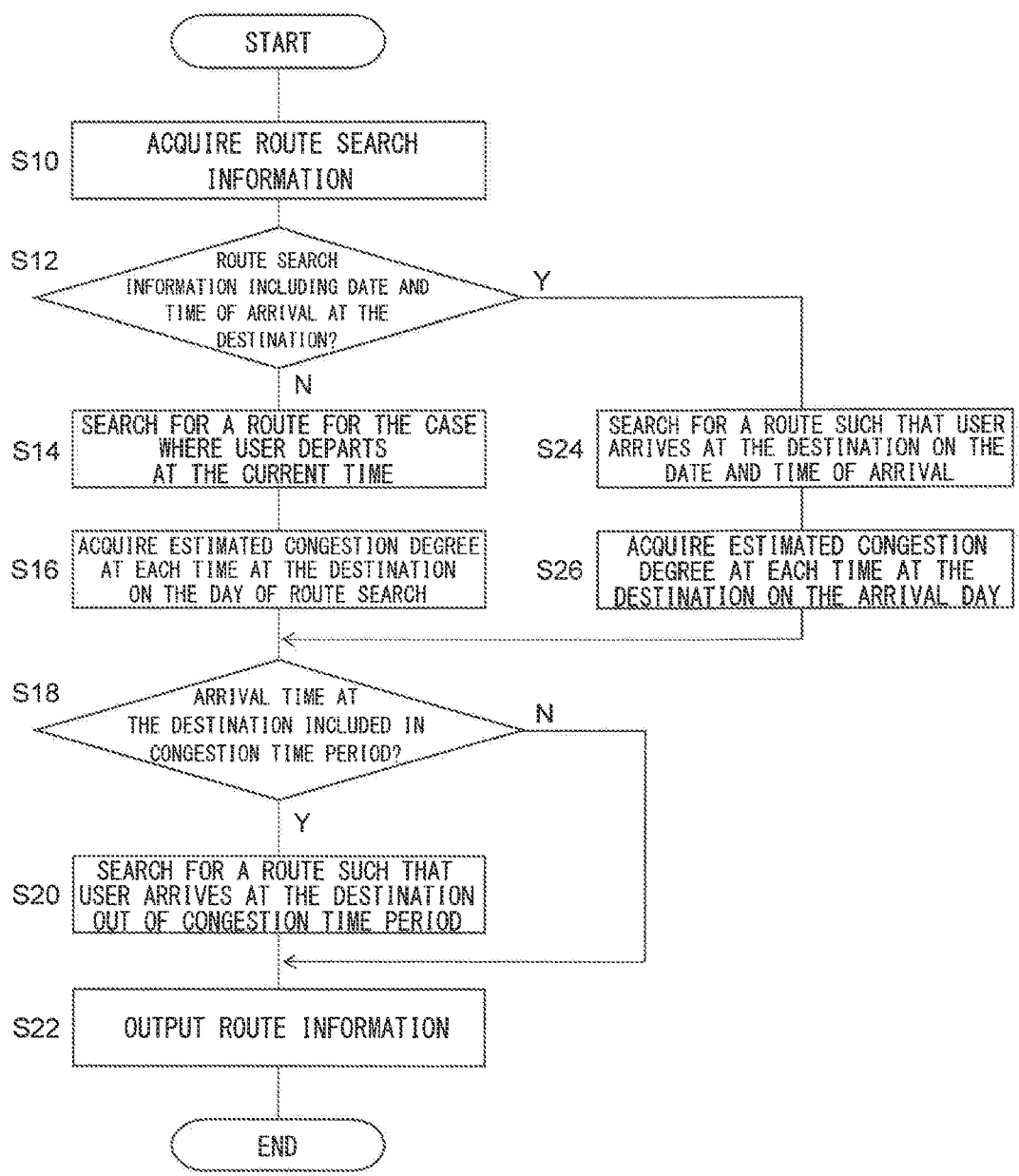
FIG. 5 is a flowchart that shows route search processing performed in the server device shown in FIG. 2.

There will now be described the overall operation of the information processing system 1 having the configuration set forth above. FIG. 5 is a flowchart that shows route search processing performed in the server device 20 shown in FIG. 2. The processing shown in FIG. 5 is performed each time the route search information is transmitted from the vehicle-mounted device 10.

The acquirer 36 acquires route search information (S10) and, when the route search information does not include date and time of arrival at the destination (N at S12), the route search unit 38 searches for a route for the case where the user departs at the current time (S14), and the acquirer 36 acquires the estimated congestion degree at each time at the destination on the day of the route search (S16). When the arrival time at the destination is included in the congestion time period (Y at S18), the route search unit 38 searches for a route such that the user can arrive at the destination out of the congestion time period (S20), the output unit 40 outputs the route information (S22), and the processing is terminated. When the arrival time at the destination is not included in the congestion time period at the step S18 (N at S18), the process proceeds to the step 322.

When the route search information includes date and time of arrival at the destination at the step 312 (Y at S12), the route search unit 38 searches for a route such that the user can arrive at the destination on the date and time of arrival (S24), the acquirer 36 acquires the estimated congestion degree at each time at the destination on the arrival day (S26), and the process proceeds to the step S18.

According to the present embodiment, since the estimated congestion degree at each time at a destination based on the route search result data is acquired, and since a route from a departure point to a destination is searched for such that the user can arrive at the destination out of the congestion time period, route information with which congestion at the destination can be avoided may be provided.

Also, since a route from a departure point through a stopover to a destination is searched for such that the user arrives at the destination later than the congestion time period, route information with which the user can effectively use the time at the stopover may be provided. Since the route searched for and the information regarding the stopover is output, the user can easily select a route based on the user's preference and situation. Since the information regarding a stopover includes advertisement for a facility at the stopover and information regarding coupons that can be used in the facility, information useful for the user's selection can be provided.

Since a route is also searched for such that the user arrives at the destination earlier than the congestion time period, a wider range of route selection can be offered to the user.

Thus, the convenience in route searches can be improved.

Described above is an explanation based on exemplary embodiments. The embodiments are intended to be illustrative only, and it will be obvious to those skilled in the art that various modifications to a combination of constituting elements or processes could be developed and that such modifications also fall within the scope of the present disclosure.

For example, although the vehicle-mounted device 10 has been described in the embodiment, the functions of the vehicle-mounted device 10 may be provided in a mobile terminal device, such as a smartphone, cellular phone, tablet terminal, notebook computer, and wearable terminal, and may be provided in a stationary information device, such as a personal computer. In this case, the environment for search is not limited to the inside of a vehicle cabin, and the route search information entered by a user may include transportation to be preferentially used.

Although an example has been described in the embodiment in which the acquirer 36, route search unit 38, output unit 40, and storage unit 34 are provided in the server device 20, these may be provided in the vehicle-mounted device 10. In this case, the acquirer 36 acquires route search information entered by a user, and acquires the estimated congestion degree at each time at a destination via the server device 20. The route search unit 38 performs a route search, and the output unit 40 outputs the congestion time period information and the route information as at least one of characters and sound. In this case, the vehicle-mounted device 10 functions as an information processing device. This modification allows greater flexibility in the configuration of the information processing system 1.

In the server device 20, the processing unit 32 may update the estimated congestion degree at each time at a destination based on the results of route searches performed by the route search unit 38. This modification enables acquisition of more accurate estimated congestion degrees also in consideration of the results of route searches conducted by multiple users of multiple vehicles.

What is claimed is:
1. An information processing device, comprising:
a processor programmed to:
acquire an estimated congestion degree for a plurality of times at a destination on the basis of route search result data; and search for a route from a departure point to the destination, the route having a travel time such that a user traveling along the route arrives at the destination earlier or later than a time period during which the estimated congestion degree at the destination is a predetermined value or greater.

2. The information processing device of claim 1, wherein the processor is programmed to search for the route from the departure point to the destination via a stopover, such that the user arrives at the destination later than the time period during which the estimated congestion degree at the destination is the predetermined value or greater.

3. The information processing device of claim 2, wherein the processor is programmed to transmit the route searched for and information regarding the stopover to a vehicle-mounted device or a mobile terminal device.

4. The information processing device of claim 1, wherein the processor is programmed to search for the route such that the user arrives at the destination earlier than the time period during which the estimated congestion degree at the destination is the predetermined value or greater.

5. An information processing method, comprising:
acquiring an estimated congestion degree for a plurality of times at a destination on the basis of route search result data; and
searching for a route from a departure point to the destination, the route having a travel time such that a user traveling along the route arrives at the destination earlier or later than a time period during which the estimated congestion degree at the destination is a predetermined value or greater.

6. The information processing method of claim 5, wherein, in the searching, the route from the departure point to the destination via a stopover is searched for such that the user arrives at the destination later than the time period during which the estimated congestion degree at the destination is the predetermined value or greater.

7. The information processing method of claim 6, further comprising transmitting the route searched for and information regarding the stopover to a vehicle-mounted device or a mobile terminal device.

8. The information processing method of claim 5, wherein, in the searching, the route is searched for such that the user arrives at the destination earlier than the time period during which the estimated congestion degree at the destination is the predetermined value or greater.

* * * * *